Patented Oct. 31, 1922.

1,433,887

UNITED STATES PATENT OFFICE.

WILLIAM J. HURST, OF BROOKLYN, NEW YORK, ASSIGNOR TO S. S. STAFFORD, INC., OF NEW YORK, N. Y., A CORPORATION OF NEW YORK.

CLEANSING AND POLISHING PREPARATION.

No Drawing.   Application filed June 17, 1922.   Serial No. 569,139.

*To all whom it may concern:*

Be it known that I, WILLIAM J. HURST, a citizen of the United States, and a resident of Brooklyn, county of Kings, State of New York, have invented certain new and useful Improvements in Cleansing and Polishing Preparations, of which the following is a specification.

My invention relates to cleansing and polishing compositions suitable for cleansing and polishing surfaces covered with paint, enamel, varnish, or the like, as on furniture, woodwork, automobiles and japanned articles.

An important object of the invention is to provide an improved polishing medium which has an affinity for, or is able to coact with, japanned, enameled, painted or varnished surfaces and the like, to bring forth the original brilliancy and form a lasting and durable surface polish. The preparation may also be used to advantage on filled or flat surfaces to improve the finish thereof but its effect is more pronounced on what I may term covered surfaces, such as those previously mentioned. Another important object of the invention is to provide a polishing and cleansing preparation of the character described which will reduce the time and labor required for gaining the desired effect, where large areas are to be treated such as automobile bodies, Pullman cars, furniture, etc. A further important object of the invention is to provide a composition of the character referred to which will not be acid but will preferably be neutral in character and will not be affected by atmospheric conditions, which might have a tendency to dull or flatten an acid solution.

The broad principle underlying my invention resides in the use of a neutralized sulpho-oleic acid oil, such as for example, castor oil, cotton seed oil, linseed oil and the like. The sulphonated oil of the character described is preferably the so-called turkey red oil which is commonly used in certain arts, but, so far as I am aware, has not heretofore been employed in a preparation for the purposes contemplated by my present invention. I prefer to incorporate with the sulpho-oleic acid oil, as will be more fully described, a non-viscous petroleum oil such as light machine oil, of for example 34° Bé., and from 70 to 90 viscosity and 340 flash point. This specific statement of the character of the non-viscous petroleum oil is, of course, mentioned only by way of example as considerable variation may be made from these particular qualities and I may use, for example, petrolatum. I do, however, prefer that the petroleum oil (by which term I mean to include petroleum) be neutral in reaction.

In order to incorporate the petroleum oil with the sulphonated oleic acid oil, and to obtain a preparation of the desired consistency, I have found that certain procedure is very important. In the first place, it is desirable that the neutralization of the sulphonated oil be very carefully and thoroughly effected so as to remove all trace of free sulphuric acid. This I accomplish by treating the sulphonated oil with ammonia or other neutralizing agent. The ammonia is especially advantageous in that any free ammonia present will undergo saponification, thereby producing a neutral compound which readily emulsifies with the petroleum oil. Prior to the neutralization of the sulphonated oil, I furthermore prefer to dissolve the sulphonated oil in water. The neutralized solution of turkey red oil in water may be emulsified with a non-viscous neutral petroleum oil and finally, if desired, the composition may have added to it an ingredient for imparting a pleasant fragrance to the preparation. For this purpose I may use some essential oil such as oil of citronella.

In order to set forth a specific example of the preparation according to my invention I may describe the following: one volume of turkey red oil (85%) is dissolved in one volume of water and this mixture or solution is neutralized with ammonia. This neutralization is not complete until the resulting mixture or solution has stood with occasional agitation for forty-eight hours. This treatment may take place at ordinary temperatures. The neutralized solution of turkey red oil in water then has added to it two volumes of extra pale sewing machine oil. The materials being mixed together are then emulsified by agitation for from four to five hours at 100 or more R. P. M., after which an emulsion, which appears to have permanent characteristics is formed. I have found this emulsion after it has remained at rest in a bottle for six months, to be still in an emulsified state. A small quantity of oil of citronella may be added during the emulsifying process. At the termination of the emulsifying process, the volume has considerably increased due to a foamy accumulation. I prefer to run the emulsified composition in to a settling tank and to allow the whole to settle for approximately forty-eight hours after which time it may be filled into containers for the market. Turkey red oil and similar sulphonated oils, when neutralized with an alkali, not only have the property of restoring the original surface of any varnished, enameled, japanned or painted object, but also, due to their solubility in water, they form an effective detergent which is very beneficial to the cleansing and polishing of the object which is being treated. This solubility in water is further important as it enables a more rapid production of an emulsion with mineral oil.

Various modifications of the above composition may be made as for the purpose of varying the consistency of the material or for substituting other ingredients having the same effect, but the invention comprises in its broader aspect, the utilization of sulphonated oils of the character set forth to provide a polishing detergent and emulsifying medium.

I claim:—

1. A composition for cleaning and polishing, comprising as an essential ingredient, sulphonated oil of the oleic acid series.

2. A composition for cleaning and polishing, comprising as an essential ingredient, sulphonated oil of the oleic acid series, combined with water and neutralized.

3. A composition for cleaning and polishing, comprising as an essential ingredient, sulphonated oil of the oleic acid series, emulsified with a petroleum oil.

4. A composition for cleaning and polishing, comprising as an essential ingredient, sulphonated oil of the oleic acid series, combined with water and emulsified with a petroleum oil.

5. A composition for cleaning and polishing, comprising as an essential ingredient, sulphonated oil of the oleic acid series, emulsified with a non-viscous petroleum oil.

6. A composition for cleaning and polishing, comprising as an essential ingredient, sulphonated oil of the oleic acid series combined with water and emulsified with a non-viscous petroleum oil.

7. An emulsion for cleaning and polishing comprising sulphonated oil of the oleic acid series, neutralized with an alkali and emulsified with a petroleum oil.

8. An emulsion for cleaning and polishing comprising sulphonated oil of the oleic acid series, neutralized with an alkali and emulsified with a non-viscous petroleum oil.

9. A composition for cleaning and dyeing comprising as an essential ingredient turkey red oil.

10. A composition for cleaning and dyeing comprising as an essential ingredient turkey red oil and a petroleum oil.

11. A composition for cleaning and dyeing comprising as an essential ingredient turkey red oil, water, and a petroleum oil.

12. A composition for cleaning and polishing comprising one volume sulphonated oleic acid oil, one volume water and two volumes petroleum oil.

13. A method of producing compositions for cleaning and polishing comprising emulsifying a petroleum oil with a sulphonated oleic acid oil.

14. A method of producing compositions for cleaning and polishing comprising dissolving sulphonated oleic acid oil in water, neutralizing the same, and emulsifying the solution with petroleum oil.

WILLIAM J HURST.

Certificate of Correction.

It is hereby certified that in Letters Patent No. 1,433,887, granted October 31, 1922, upon the application of William J. Hurst, of Brooklyn, New York, for an improvement in "Cleansing and Polishing Preparations," errors appear in the printed specification requiring correction as follows: Page 2, line 66, claim 9, for the word "dyeing" read *polishing;* same page, lines 69 and 72, claims 10 and 11, for the syllable "dye-" read *polish-;* and that the said Letters Patent should be read with these corrections therein that the same may conform to the record of the case in the Patent Office.

Signed and sealed this 5th day of December, A. D., 1922.

[SEAL.]
KARL FENNING,
*Acting Commissioner of Patents.*